Oct. 17, 1967 P. A. JENSEN 3,348,034

DECISION CIRCUIT FOR USE IN SIGNAL PROCESSING SYSTEMS

Filed March 13, 1964 3 Sheets-Sheet 1

WITNESSES

Theodore F. Wrobel

James F. Young

INVENTOR

Paul A. Jensen

BY Dean Schron

ATTORNEY 3,348,034

DECISION CIRCUIT FOR USE IN SIGNAL PROCESSING SYSTEMS

Paul A. Jensen, Baltimore, Md., assignor to Westinghouse Electric Corporation, Pittsburgh, Pa., a corporation of Pennsylvania Filed Mar. 13, 1964, Ser. No. 351,694
9 Claims. (Cl. 235—193)

ABSTRACT OF THE DISCLOSURE

A plurality of lines receives redundant input signals, with each line including a variable resistance means and a non-linear resistance means, and being connected together at a common output point. A control circuit also receives the redundant input signals to obtain a median signal. The input signals are compared with the median signal over a predetermined time duration and the difference between the median signal and each input signal is accumulated over the period of time so that the most median input signal over that period of time may be obtained. Once obtained, the variable resistance in that line receiving the most median signal over the predetermined period of time is set to a zero value while the other variable resistances in the remaining lines are set to some finite value. Should an input signal deviate more than a predetermined amount, its line is removed from the system by open circuiting.

This invention in general relates to decision circuits, and more in particular to a decision circuit particularly well adapted for use in signal processing systems such as an analog computer for deriving an output signal in response to a plurality of redundant analog input signals which are nominally identical, but which in actuality, may vary from one another.

Many electronic systems must be kept in use or in continual readiness with substantially no possibility for failure, maintenance, or repair time. To achieve these aims, the systems have been designed as redundant systems which provide the capability to overcome failures and to provide correct operation despite the presence of incorrect or failed signals in the system network.

One type of redundancy involves the duplication of an entire system, or subsystems of the system, so that in the event of a failure, the spare subsystem or system will be switched in, to replace its failed counterpart. Another type of redundancy is one wherein a plurality of nominally identical signals, that is, signals which should have the same value, are utilized in some sort of a decision circuit which will provide a correct output signal even if the input signals presented to it have deviated from one another or have reverted to a failed condition. One type of decision circuit which may be utilized in a digital system, but is particularly well adapted for an analog type system involves the use of a plurality of current limiting non-linear resistance elements. A plurality of lines is provided for receiving nominally identical input signals with each line including the non-linear resistance element, and being all connected together at a common junction point at which the output voltage is obtained. The ideal voltage-current curve for the non-linear resistors is such that for any voltage across the resistor, it will pass either a positive or negative saturation current. Due to unequal time delays in the redundant circuitry providing the input signals to the decision circuit, the input signals may be slightly shifted in phase from each other and the decision circuit will provide, at the common connection output point, an output signal which is the median signal of those signals presented to it. As the input analog signals vary, they may be out of phase or degraded in some other manner so that the output median signal may have slight irregularities when one or more of the input signals, for example, changes direction before the others. Further processing in subsequent circuits of the median output signal having these irregularities, would result in erroneous information being processed and highly unreliable results will be obtained therefrom.

It is therefore a primary object of the present invention to provide apparatus for improving the reliability of signal processing systems.

It is another object to provide a decision circuit to improve the reliability of analog systems.

Another object is to provide a decision circuit for providing an output signal in response to a plurality of input signals and in which only one input signal generally will control the output of the decision circuit.

Another object is to provide a decision circuit which will protect against input signals which deviate strongly from other input signals.

Another object is to provide a decision circuit which will eliminate consistently disagreeing input signals.

Briefly, in accordance with the above objects, there is provided a decision circuit particularly well adapted for use in redundant analog signal processing systems and includes a plurality of input lines for receiving input signals, with each line including a non-linear resistance means. An additional variable resistance means is included in each line and means are provided which is responsive to the input signals, more particularly, to the most median of the input signals over a predetermined period of time, for deriving signals to control the values of the variable resistance means such that the most median input signal over a predetermined period of time governs the output signal for a subsequent period of time.

The above-stated and other objects will become more clearly apparent after a study of the following specification when read in conjunction with the accompanying drawings, in which.

Figure 1:
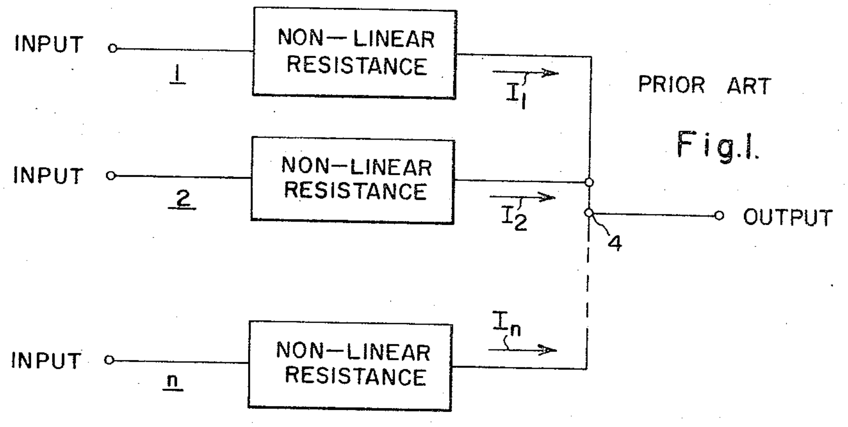
PRIOR ART Fig.1.
FIGURE 1 illustrates a decision circuit of the prior art.
Figure 2:
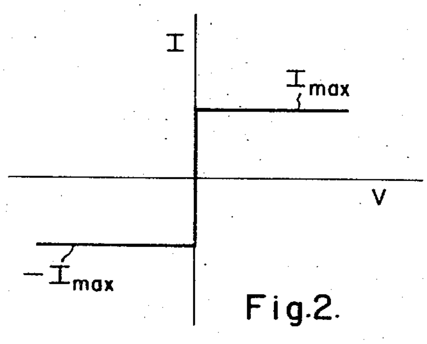
FIG. 2 illustrates an ideal voltage-current characteristic curve of the non-linear resistance means of FIG. 1.

Referring now to FIG. 1, there is shown a decision circuit of the prior art, the explanation of which will aid in an understanding of the present invention. The circuit of FIG. 1 includes a plurality of input lines 1, 2, . . . *n*, with each line including a current limiting non-linear resistance means one end of which is connected at a common junction point 4 from which a single output signal is obtained in response to a plurality of input signals. Although the apparatus described herein may be utilized in digital circuitry, it is particularly well adapted for use in analog systems and will be described with respect thereto. Each of the non-linear resistance means has an ideal voltage-current characteristic curve as shown in FIG. 2, where I represents the current through, and V represents the voltage across, the non-linear resistance means. It is seen that for any positive voltage drop across the non-linear resistance means, a saturation current having a value of $I_{max}$ will flow therethrough and for any negative voltage difference, a saturation current of $-I_{max}$ will flow therethrough. A voltage current characteristic curve such as shown in FIG. 2 may be obtained, for example, utilizing different arrangements of diodes or transistor elements, or pentode tubes, with proper voltage supplies.

Ideal operation of the decision circuit of FIG. 1 is as follows: assuming that there are $n$ input signals to $n$ lines, where $n$ is odd, it is possible that the input signals may differ slightly such that there is a median voltage and are as many input voltages above the median voltage as there are below it. The voltage inputs above the median voltage will each supply a current of $I_{max}$ to the common connection point 4 whereas the voltage inputs below the median will each drain $I_{max}$ away from the common point 4. By applying Kirkoff's law on the sum of the currents at point 4, it is seen that the law is satisfied if the input signal providing the median voltage provides zero current and the output voltage therefore must equal the median voltage since there is no voltage drop across its associated non-linear resistor means.

From the voltage current curve of FIG. 2 it is seen that with no voltage drop across the non-linear resistance, any current up to $\pm I_{max}$ may flow through it; such is the case when several input signals may have identical values. For example, suppose in FIG. 1 that $n$ is 3 and lines 1 and 2 receive at an instant of time, signals having the value of, for example, 10 and the remaining line receives an input signal having a value of 5. The median output signal will be 10, and the voltage drop across the third non-linear resistance means will be such as to drain $I_{max}$ away from the common connection 4. Although the voltage drop across the non-linear resistance means in lines 1 and 2 is zero, any current up to $I_{max}$ may flow therethrough, the sum of $I_1+I_2$ being equal to the absolute value of the $I_{max}$ current in the third input line.

Figure 3:
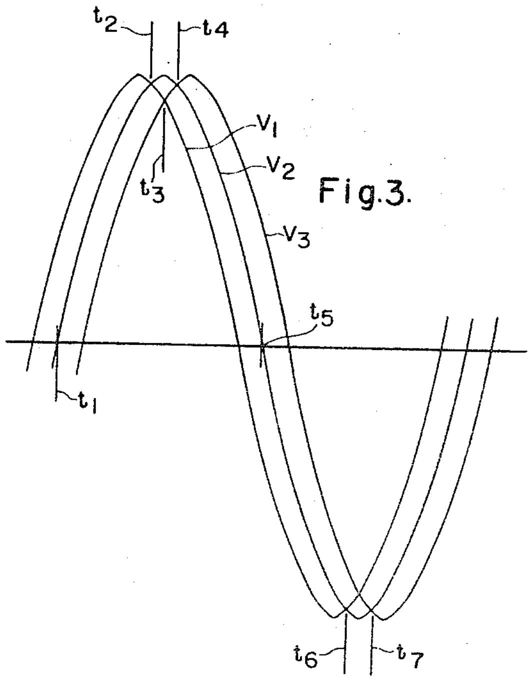
FIG. 3 illustrates a plurality of input signals which may be applied to the decision circuit of FIG. 1.
Figure 4:
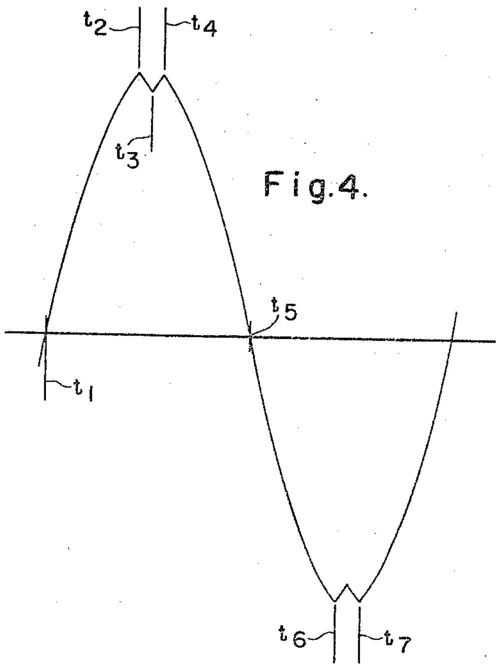
FIG. 4 illustrates an output signal provided by the decision circuit of FIG. 1 in response to the input signals of FIG. 3.

The operation of the decision circuit of FIG. 1 is satisfactory for many applications; however, in some instances highly erroneous signals may be provided, and to this end reference should now be made to FIGS. 3 and 4.

FIG. 3 shows three nominally identical input signals, $V_1$, $V_2$ and $V_3$, which have for some reason been shifted in phase with respect to one another. It is desired to provide an output signal which is a reproduction of the median input signal. It is seen that at time $t_1$, the $V_2$ signal is intermediate the $V_1$ and $V_3$ signals and therefore constitutes the median signal which will be provided as the output signal, represented by the curve of FIG. 4. From time $t_1$ to $t_2$, signal $V_2$ remains the median, however at time $t_2$ signal $V_1$ becomes the median, until time $t_3$, at which point the signal $V_3$ becomes the median up until time $t_4$ where the input signal $V_2$ again becomes the median signal. By examining FIG. 4 it is seen that from time $t_2$ to $t_4$ there is a dip in the output signal when in actuality none of the input signals had this characteristic. If the output signal of FIG. 4 is subsequently processed by, for example, one or more differentiation stages, a discontinuity results therefrom due to the differentiation of the irregularity, and may consequently cause erroneous operation or results. It is seen that the input signal $V_2$ remains the median from time $t_4$ to $t_6$ subsequent to which an irregularity will be produced in the output signal, as shown in FIG. 4, up until time $t_7$. For applications where the irregularity in the output signal would adversely affect subsequent circuitry, it would, in most instances, appear that any one of the redundant input signals would provide a better representation of the correct signal for further analog processing.

Figure 5:
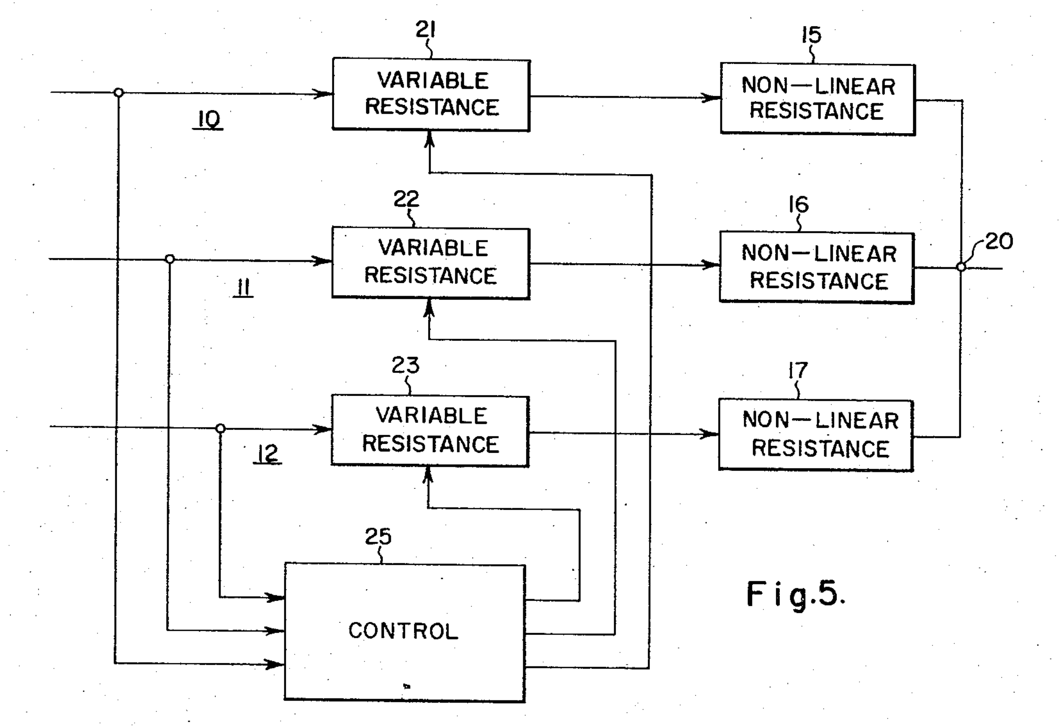
FIG. 5 illustrates in block diagram form a preferred embodiment of the present invention.

The embodiment of the present invention illustrated in FIG. 5 provides, in response to a plurality of identical, or nominally identical, input signals, an output signal which is a substantial reproduction of the most median input signal over a preceding predetermined period of time. The output signal always agrees with only one chosen input signal when the remaining input signals deviate from the chosen signal within predetermined bounds. If the chosen input signal should suddenly deviate strongly from the remaining input signals, the output signal will be degraded slightly rather than follow an obvious erroneous input signal. The embodiment of FIG. 5 includes a plurality of input lines of which three, 10, 11 and 12, are shown. Each input line includes a non-linear resistance means 15, 16 and 17 respectively, each having the voltage current characteristic curve as shown in FIG. 2, and each having one end connected to a common junction point from which the output signal is obtained. Additionally included in each of the input lines 10, 11 and 12 are other resistance means 21, 22 and 23 respectively. Control means 25 is responsive to the input signals for deriving control signals for controlling the resistance means 21, 22 and 23, each of which has the capabiilties of assuming a first, and a higher, second resistance value. For eliminating the effect of a highly erroneous input signal on the output of the decision circuit of FIG. 5, each of the resistance means may take on an infinite value.

In the preferred embodiment described herein, the first resistance value will be zero. In operation, the control means 25 will sense which of the input signals is the most median for a predetermined period of time and produce control signals which will set the resistance means in the input line receiving that signal to zero, the first value, and will set the remaining resistance means to some finite value R, the second value. The output signal at the common junction point 20 therefore will be a replica of the signal appearing on the line having the zero resistance. The operation of the circuit is divided into predetermined time periods, which may for example be a half of a cycle of an input signal. During the time that the most median input signal is being reproduced at the common junction point 20, the control means 25 is again determining the most median input signal in order to set one of the resistance means 21, 22 or 23 to a zero value for a subsequent predetermined period of time. By way of example, and with specific reference again to FIG. 3, assume that prior to time $t_1$ the input signal $V_2$ was determined to be the most median input signal. If the operation is divided into half-cycle time intervals, the control means 25 will sense the most median input signal from time $t_1$ to time $t_5$ for controlling the output signal for a subsequent period of time. From the input signals shown in FIG. 3 it is seen that input signal $V_2$ is the median, until time $t_2$, and from time $t_4$ to time $t_5$. Since the input signal $V_2$ is the most median during this predetermined time period, the control means 25 will produce a signal to make the resistance in the line receiving $V_2$ take on a zero value and to make the lines receiving the $V_1$ and $V_3$ signals take on a finite RR value. For the next predetermined time period of half-cycle, the output signal will be a reproduction of the $V_2$ input signal thus eliminating the irregularity from time $t_6$ to $t_7$.

Figure 6:
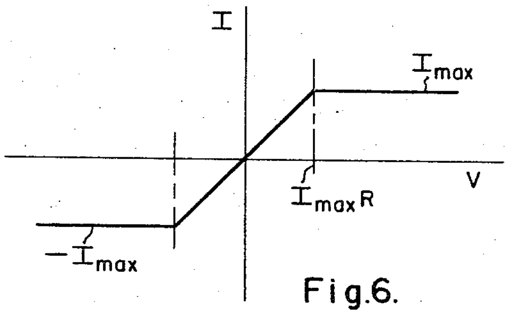
FIG. 6 illustrates a voltage-current characterstic curve of a non-linear resistance means modified by a linear resistance means.

FIG. 2 illustrates the voltage-current characteristic curve of the non-linear resistance means. In FIG. 6 there is shown the resulting voltage-current characteristic curve of a typical input line in which the resistance means takes on some finite value R. This characteristic incorporates a linear resistance region and a current limited region. It is seen that for any voltage difference across the non-linear resistance means which is greater than $I_{max}R$, $I_{max}$ will flow in the line incorporating that particular non-linear resistance means. For small voltage differences between the input and output signals, that is, less than $I_{max}R$, is seen that some finite current ranging from $I_{max}$ to $-I_{max}$ may flow in a particular line. Generally, if there is a voltage drop in each of the lines except the $i$th line, the output "sees" the input voltage on that $i$th line. Otherwise stated, the input voltage to the line having zero resistance will govern the output signal.

It was stated that the output signal is governed by the input signal to the line containing the resistance set to a zero value. As was seen, an output signal was produced which contained no irregularities, and such is the case where the input signals differ from one another by some relatively small predetermined deviation. Suppose however that the chosen input signal suddenly deviates strongly and for example reverts to a failed condition. Theoretically, since that signal is being applied to the line containing no series resistance, the output signal should also revert to a failed condition. The present invention would obviate this undesirable operation, and will remove the erring signal's influence on the output for subsequent time periods. It may be shown that the output will follow the chosen input as long as the average deviation of the remaining lines, from the chosen input, is less than some predetermined amount, which amount is proportional to $I_{max}R$. It follows therefore, that the value of R governs the allowable average deviation below which the output will follow the chosen input and above which the output signal will equal an amount approximately equal to the average of the remaining input signals. If an input signal other than the chosen one, fails to some extreme state, causing the chosen line to supply $I_{max}$ to the failed line, the output signal will be the average of the remaining input signals excluding the chosen signal and the failed signal.

The finite value of the resistance means, R may be chosen with consideration to several variables, such as the voltage values of the input signals; the voltage-current characteristic values of the non-linear resistance means; the type of system in which the decision circuit is utilized; the types of signals being processed; and accuracy desired, to name a few. As a general rule, the higher the value of R, the higher the allowable average deviation before the output does not follow the chosen input. An example of an extreme case is one wherein the value of R in all of the input lines, except the chosen one, is to have an infinite value. In such a case the output will always follow the chosen input since the remaining lines are, in effect, open circuited. At the other extreme if the value of R is made equal to zero, then the output signal will be equal to the median of the input signals as was the case with the prior art of FIG. 1. In a typical system the value of R will most probably have a finite value such that radical deviations of the input signals will provide a usable output signal and that in the absence of radical deviations the output will follow a chosen input.

Figure 7:
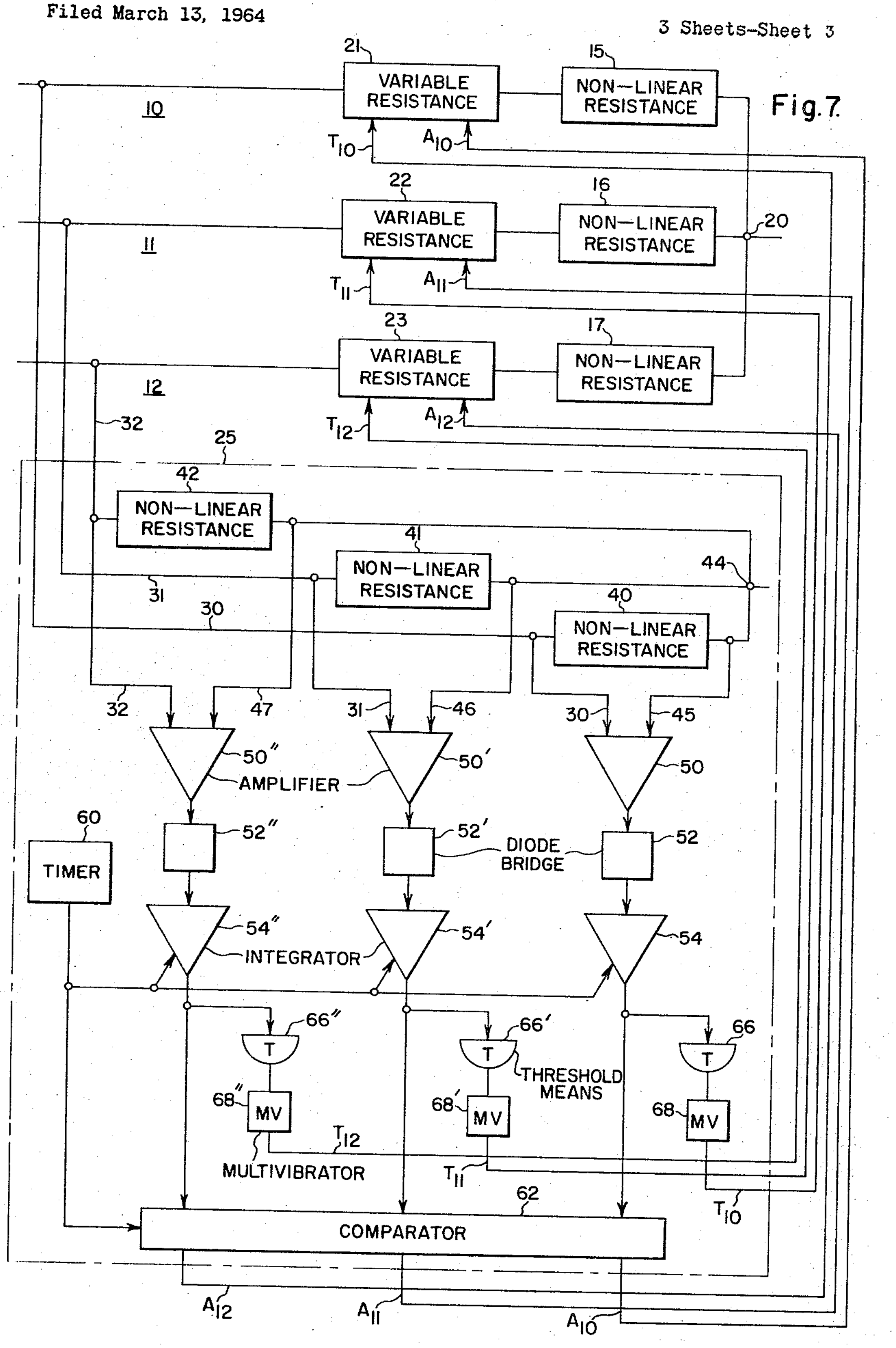
FIG. 7 illustrates an embodiment of the present invention in more detail.

FIG. 7 illustrates in somewhat more detail an operative illustration of the present invention. A first plurality of inputs, 10, 11 and 12, is identical to that shown in FIG. 5. Control means 25 includes a second plurality of input lines with each line including a non-linear resistance means 40, 41 and 42 respectively, each having a voltage-current characteristic as that shown in FIG. 2 and each having one end connected at a common junction point 44. Lead 30 is connected to receive the input signal on input line 10, lead 31 to receive the input signal on input line 11 and lead 32 to receive the input signal on input line 12. The non-linear resistance means 40, 41 and 42 are responsive to the input signals and will provide a median output signal therefrom at the common junction point 44 as was explained with respect to the circuit of FIG. 1.

The control means 25 senses the deviation of an input signal from the median, during a predetermined period of time, for deriving control signals to insure that the input signal having the least deviation during that period of time will govern the output signal at the common junction point 20. In order to sense the deviation of an input signal from the median, each of the non-linear resistance means 40, 41 and 42 has connected thereacross a difference amplifier 50, 50′ and 50″, each of which receives on one input thereof a respective input signal, and on another input thereof the median signal. By way of example, difference amplifier 50 receives the input signal appearing on input line 10 by means of lead 30 and receives the median signal by means of lead 45 which is operatively connected to receive the output median signal appearing at the common junction point 44. In a similar manner, difference amplifier 50′ receives the input signal appearing on input line 11 by means of lead 31, and the median signal by means of lead 46. Difference amplifier 50″ receives the input signal appearing on input line 12 by means of lead 32, and the median signal by means of lead 47. During the course of operation, an input signal may have a value higher than the median while another input signal may have a value lower than the median, such as the case at time $t_1$ of FIG. 3. Means are provided to accumulate the total deviation during a predetermined period of time which means may take the form of integrators 54, 54′ and 54″. Since the total deviation during the predetermined period of time is desired, means are provided for obtaining the absolute value of the output of the difference amplifier so that a negative voltage difference will not cancel a positive voltage difference which may occur. This means may take the form of a simple diode bridge 52, 52′, and 52″.

As was stated, each input signal is compared with the median over a predetermined period of time. Timer 60 is provided to govern this predetermined period of time. A pulse produced by the timer 60 each period of time will gate the contents of the integrators 54, 54′ and 54″, representing the accumulated deviation from the median signal, to comparator means 62 which is responsive to the outputs of the integrator means and a timing pulse, for providing a signal to control the other resistance means 21, 22 or 23 in the input lines. By way of example, the comparator 62 may produce a signal on one of the three lines shown, $A_{10}$, $A_{11}$, or $A_{12}$, the presence of a signal signifying that a respective integrator had the least accumulated voltage indicating that a corresponding input signal had the least deviation during the predetermined time period. The signal may then be utilized to set the resistance means to zero while the absence of a signal on the remaining leads from the comparator 62 may be utilized to set the remaining resistances to a finite value R. In order to sense when an individual input signal deviates radically from the median, there is provided threshold means 66, 66′ and 66″ responsive to the output signal provided by integrators 54, 54′ and 54″, respectively, such that if the accumulated signal is above a predetermined threshold, the threshold element will provide a signal to a respective multivibrator 68, 68′ and 68″. Each multivibrator output, as $T_{10}$, $T_{11}$ and $T_{12}$ respectively, may govern a respective resistance means 21, 22 or 23 to make it attain an infinite value so as to eliminate the influence of the radically deviant input signal, on the output signal.

Figure 8:
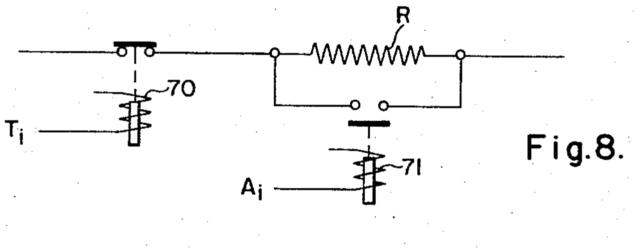
FIG. 8 illustrates one realization of the variable resistance means of FIGS. 5 and 7.

FIG. 8 shows one embodiment of a resistance means which may be utilized as the resistance means designated 21, 22 or 23. The resistance means of FIG. 8 include a normally closed relay 70, a normally open relay 71 and a finite resistance R. With the coil of relay 70 deenergized by the absence of a $T_i$ signal and the coil of relay 71 deenergized by the absence of an $A_i$ signal ($i=10$, 11 or 12) and the resistance means of FIG. 8 will have a finite value of R. If the resistance means is in an input line to which is applied the input signal that will govern the output signal, the coil of relay 71 will receive an $A_i$ signal, closing it, thereby making the total resistance of the resistance means equal to zero. The resistance means of the remaining lines will have a finite value of R. If an input signal has deviated to an extent whereby a threshold device activates its respective multivibrator and produces a $T_i$ signal, the presence of a $T_i$ signal to the coil of relay 70 will activate it, thus causing an open circuit, the resistance means takes on an infinite value and the effect of that input signal is removed from the output.

In order to more fully demonstrate the operation of the embodiment shown in FIG. 7 a situation will be considered wherein the input signals $V_1$, $V_2$ and $V_3$, of FIG. 3, are applied respectively to input lines 10, 11 and 12. The timer 60 will be set so as to provide a pulse at approximately every half cycle of the input signals. Suppose that for a time previous to $t_1$, $V_2$ had been the median signal and that the timer 60 has provided a pulse to clear the integrators 54, 54' and 54'' so that from time $t_1$ to time $t_5$, the input signals will be compared with the median. From time $t_1$ to $t_2$ input signal $V_1$ deviates from the median $V_2$, the absolute value of the deviation is obtained and accumulated in the integrator 54. Similarly, input signal $V_3$ appearing on input line 12 deviates from the median, the absolute value of the deviation being taken and accumulated in integrator 54''. During this same period since $V_2$ appearing on input line 11 is the median voltage, there is no difference, and the contents of the integrator 54' will remain zero. From time $t_2$ to $t_3$, input signal $V_1$ is the median and from time $t_3$ to $t_4$, input signal $V_3$ is the median. During the time interval $t_2$ to $t_4$, the contents of integrator 54' increases slightly while the contents of integrator 54 and 54'' increases for half the time. The slight increase in the contents of the integrator 54' for the example shown, nowhere equals nor approaches the contents of the other integrators. From time $t_4$ to time $t_5$ where the next timer pulse will be applied, $V_2$ again is the median signal and the contents of both integrators 54 and 54'' increase while the contents of integrator 54' remains constant. The pulse from timer 60 gates the accumulated signals in the integrators to the comparator 62 which will provide a signal in accordance with the integrator having the least accumulated value; in this case a signal will appear at $A_{11}$ and no signals will appear at $A_{10}$ or $A_{12}$. The $A_{11}$ signal fed to resistance means 22 controls it in a manner such that it takes on a zero value as was explained, and the absence of a signal at $A_{10}$ and $A_{12}$ insures that resistance means 21 and 23 take on a finite R value. The timing pulse which gates the accumulated signal in the integrators 54, 54' and 54'', simultaneously resets them to zero and the aforedescribed operation is repeated with input signal $V_2$ appearing as the output signal at the common junction point 20 for a subsequent period of time.

In summary therefore, there has been provided a decision circuit which will determine which input of a number of nominally identical redundant inputs is most likely to be the correct one. It can withstand failures with some relatively small degradation of its output signal and eliminate the effects of a failure within a chosen time. The inclusion of the present invention in a signal processing system such as an analog system will significantly increase the reliability thereof.

Although the present invention has been described with a certain degree of particularity, it should be understood that the present disclosure has been made by way of example and that modifications and variations of the present invention are made possible in the light of the above teachings.

What is claimed is:

1. A decision circuit comprising:
a plurality of input lines for providing an output signal in response to a plurality of input signals;
means responsive to said input signals for deriving a median signal;
means for comparing said input signals with said median signal over a predetermined period of time for governing which of said input signals appears as said output signal over a subsequent period of time.

2. A decision circuit for a redundant system comprising:
a plurality of input lines each for receiving an input signal and each including a non-linear resistance element;

variable linear resistance means for each said line;
means responsive to said input signals for deriving a median signal; and
means responsive to the difference between said median signal and each of said input signals compared over a predetermined period of time, for controlling the value of the variable linear resistance in each said line.

3. A decision circuit for a redundant analog system, comprising:
a plurality of input lines for receiving redundant analog input signals, each line including a current limiting non-linear resistance means;
variable linear resistance means for each said input line, capable of assuming at least a first, and a second higher resistance value;
means responsive to said input signals for setting the variable linear resistance means in each line to one of said values.

4. A decision circuit for a redundant analog system, comprising:
a plurality of input lines for receiving redundant analog input signals, each line including a current limiting non-linear resistance means;
variable linear resistance means for each said input line, capable of assuming at least zero and finite resistance values, and
means responsive to the most median input signal during a predetermined period of time for setting the variable linear resistance to said zero value in the line receiving said most median input signal and for setting the remaining variable linear resistances to said finite value.

5. A signal processing circuit comprising:
a plurality of input lines for receiving redundant analog input signals, each said line including a non-linear resistance means;
other resistance means for each said line capable of assuming one of a zero, finite and infinite value;
means responsive to said input signals for setting the resistance means to a zero value in the input line receiving the most median input signal over a predetermined period of time, setting the resistance means to an infinite value in any line receiving an input signal which deviates a predetermined amount from said most median input signal, and setting the remaining resistance means to said finite value.

6. A decision circuit comprising:
a plurality of input lines connected together at a junction point;
each said input line including a current limiting non-linear resistance means and a linear resistance means;
each said input line having applied thereto an input signal; and
means responsive to the input signals on said lines for controlling the linear resistance in said lines to allow the most median input signal, over a preceding predetermined period of time, to appear at said junction point for a subsequent period of time.

7. A decision circuit for a signal processing system, comprising:
a first plurality of input lines each including a variable resistance means and a non-linear resistance means for providing an output signal in response to a plurality of input signals;
a second plurality of input lines each including a non-linear resistance means for deriving a median signal from said input signals; and
means responsive to the voltage difference across each said non-linear resistance means in said second plurality of input lines for controlling in a predetermined manner, the variable resistance means in the input line receiving an input signal differing least from said median signal during a predetermined period of time.

8. A decision circuit for a redundant analog system, comprising:

a plurality of input lines each including a variable resistance means and a current limiting non-linear resistance means for providing an output signal in response to redundant analog input signals;

other current limiting non-linear resistance means connected to each said input line for deriving a median signal in response to said input signals;

difference means for sensing a voltage difference across each said other non-linear resistance means for deriving a difference signal;

a plurality of integrator means each for integrating a respective one of said difference signals;

means for comparing the contents of said integrator means at predetermined intervals for deriving signals for controlling said variable resistance means.

9. A decision circuit for a redundant analog system, comprising:

a plurality of input lines each including a variable resistance means and a current limiting non-linear resistance means for providing an output signal in response to redundant analog input signals;

other current limiting non-linear resistance means connected to each said input line for deriving a median signal in response to said input signals;

difference means for sensing a voltage difference across each said other non-linear resistance means; for deriving a difference signal;

a plurality of integrator means each for integrating the absolute value of a respective one of said difference signals;

means responsive to said integrator means for deriving control signals to make one of said variable resistance means attain a value less than the others of said variable resistance means; and threshold means for making specified ones of said variable resistance means attain an infinite value if the contents of specified ones of said integrator means exceeds a predetermined threshold value.

References Cited

UNITED STATES PATENTS

| | | | |
|---|---|---|---|
| 2,897,476 | 7/1959 | Widess | 340—172 X |
| 2,924,812 | 2/1960 | Merritt et al. | 340—146.3 |
| 3,173,127 | 3/1965 | Brunner | 340—147 |
| 3,177,350 | 4/1965 | Abbott et al. | 235—197 X |
| 3,182,292 | 5/1965 | Schmid | 340—172 X |
| 3,292,150 | 12/1966 | Wood | 235—193 X |

MALCOLM A. MORRISON, *Primary Examiner.*

I. KESCHNER, J. RUGGIERO, *Assistant Examiners.*